(12) United States Patent
Wang et al.

(10) Patent No.: US 11,432,216 B2
(45) Date of Patent: Aug. 30, 2022

(54) SMART DATA SERVICE LINK SWITCHING AMONG SUBSCRIBER IDENTITY MODULES

(71) Applicant: QUALCOMM Incorporated, San Diego, CA (US)

(72) Inventors: Hanyang Wang, Beijing (CN); Pranesh Sinha, San Diego, CA (US); Ajit Chourasia, San Diego, CA (US); Zheng Fang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 16/922,843

(22) Filed: Jul. 7, 2020

(65) Prior Publication Data
US 2021/0029604 A1 Jan. 28, 2021

Related U.S. Application Data

(60) Provisional application No. 62/878,854, filed on Jul. 26, 2019.

(51) Int. Cl.
H04W 4/00 (2018.01)
H04W 36/14 (2009.01)
H04W 36/32 (2009.01)
H04W 36/30 (2009.01)
H04W 88/06 (2009.01)

(52) U.S. Cl.
CPC ........... *H04W 36/14* (2013.01); *H04W 36/30* (2013.01); *H04W 36/32* (2013.01); *H04W 88/06* (2013.01)

(58) Field of Classification Search
CPC ..... H04W 36/14; H04W 36/30; H04W 36/32; H04W 88/06; H04W 8/183

USPC .......................................................... 370/331
See application file for complete search history.

(56) References Cited

U.S. PATENT DOCUMENTS

| 9,380,525 | B2 * | 6/2016 | Kanamarlapudi | .... H04W 8/183 |
| 10,713,613 | B2 * | 7/2020 | Hage | ...................... G01D 21/02 |
| 10,873,902 | B2 * | 12/2020 | Fulzele | ............... H04W 72/048 |
| 2010/0311404 | A1 | 12/2010 | Shi et al. | |
| 2013/0329639 | A1 | 12/2013 | Wietfeldt et al. | |
| 2017/0280380 | A1 * | 9/2017 | Gundu | ................. H04B 1/3816 |
| 2019/0342943 | A1 * | 11/2019 | Rice | ...................... H04W 8/183 |
| 2020/0279446 | A1 * | 9/2020 | Hage | ..................... H04W 4/029 |
| 2020/0374979 | A1 * | 11/2020 | Rice | ...................... H04W 24/08 |

(Continued)

FOREIGN PATENT DOCUMENTS

| WO | 2017008386 A1 | 1/2017 |
| WO | 2017113527 A1 | 7/2017 |

OTHER PUBLICATIONS

International Search Report and Written Opinion—PCT/US2020/041252—ISA/EPO—dated Oct. 8, 2020.

*Primary Examiner* — Amancio Gonzalez
(74) *Attorney, Agent, or Firm* — Patterson + Sheridan, LLP

(57) ABSTRACT

Certain aspects of the present disclosure provide techniques for smart data service link switching (SLS) among subscriber identity modules (SIMs). An example method that may be performed by a user equipment (UE) includes communicating data via an active link, wherein the active link comprises a first link of a first data subscriber identity module (SIM) of the UE; determining, based on one or more parameters, to switch the active link to a second link of a second data SIM of the UE; and switching the active link to the second link.

26 Claims, 8 Drawing Sheets

(56) References Cited

U.S. PATENT DOCUMENTS

2020/0383152 A1\* 12/2020 Walia ................... H04W 76/12
2022/0053607 A1\* 2/2022 Rice ..................... H04W 24/08

\* cited by examiner

SMART DATA SERVICE LINK SWITCHING AMONG SUBSCRIBER IDENTITY MODULES

CROSS-REFERENCE TO RELATED APPLICATIONS

The present Application for Patent claims priority to and the benefit of U.S. Application No. 62/878,854, filed on Jul. 26, 2019, which is assigned to the assignee hereof and hereby expressly incorporated by reference in its entirety as if fully set forth below and for all applicable purposes.

BACKGROUND

Field of the Disclosure

Aspects of the present disclosure relate to wireless communications, and more particularly, to techniques for smart (i.e., based on data service parameters) data service link switching among subscriber identity modules (SIMs) of user equipments (UEs).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved data communication between UEs with multiple subscriber identity modules (SIMs) and base stations in a wireless communications network.

Certain aspects provide a method for wireless communication performed by a user equipment (UE). The method generally includes communicating data via an active link, wherein the active link comprises a first link of a first data subscriber identity module (SIM) of the UE; determining, based on one or more parameters, to switch the active link to a second link of a second data SIM of the UE; and switching the active link to the second link.

Certain aspects provide an apparatus for wireless communication. The apparatus generally includes a processor configured to communicate data via an active link, wherein the active link comprises a first link of a first data subscriber identity module (SIM) of the apparatus; determine, based on one or more parameters, to switch the active link to a second link of a second data SIM of the apparatus; and switch the active link to the second link. The apparatus generally includes a memory coupled with the processor.

Certain aspects provide an apparatus for wireless communication. The apparatus generally incudes means for communicating data via an active link, wherein the active link comprises a first link of a first data subscriber identity module (SIM) of the apparatus; means for determining, based on one or more parameters, to switch the active link to a second link of a second data SIM of the apparatus; and means for switching the active link to the second link.

Certain aspects provide a computer-readable medium. The computer-readable medium generally includes code stored thereon that, when executed by a processing system, cause the processing system to communicate data via an active link, wherein the active link comprises a first link of a first data subscriber identity module (SIM) of the processing system; determine, based on one or more parameters, to switch the active link to a second link of a second data SIM of the processing system; and switch the active link to the second link.

To the accomplishment of the foregoing and related ends, the one or more aspects comprise the features hereinafter fully described and particularly pointed out in the claims.

The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
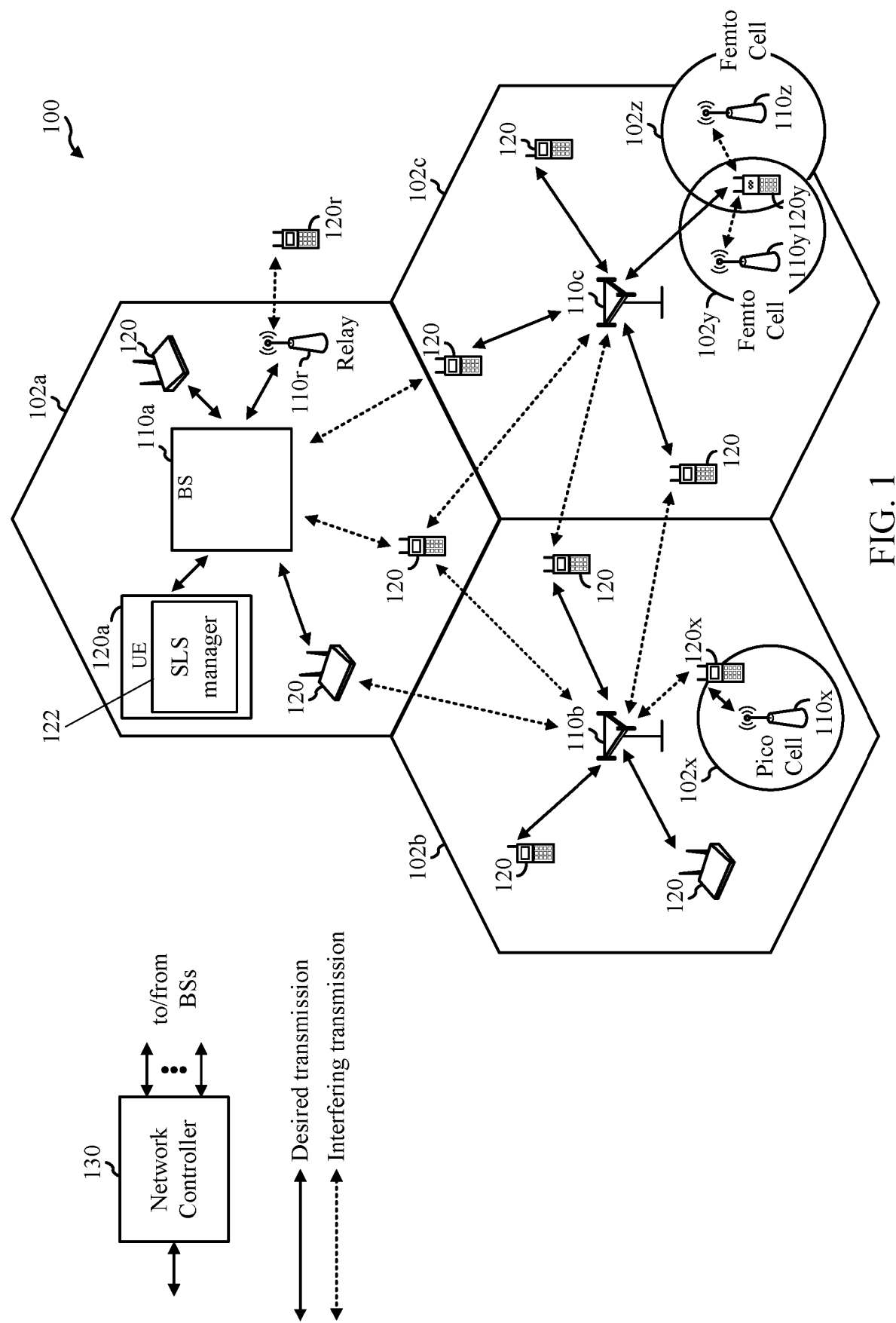
FIG. 1 is a block diagram conceptually illustrating an example telecommunications system, in accordance with certain aspects of the present disclosure.

Aspects of the present disclosure provide apparatus, methods, processing systems, and computer readable mediums for smart data service link switching (SLS) among subscriber identity modules (SIMs). According to previously known techniques, a user operating UE with multiple subscriber identity modules (SIMs), which may be an embedded SIM (e-SIM or eSIM), can only manually designate one SIM for default data service. If the UE is moved to a location where coverage of the network supporting this SIM (and the corresponding carrier) is not good or there is no service supporting this SIM, then the user has to manually switch the UE to begin using another SIM (and corresponding network) to continue using data service with the other SIM's data plan. Manually switching the UE to begin using another SIM causes a service interruption for the user and an undesirable user experience. Also, the user's multiple SIMs asset and data plan may not be fully utilized, due to the user not manually switching back to the first SIM when the user travels back into coverage of the network of the first SIM. According to aspects of the present disclosure, a UE automatically determines to switch an active data link to a candidate link selected from among candidate links of multiple SIMs of the UE, based on link quality of the active data link and of the candidate links of the SIMs and/or other criteria, and then switch the active data link according to the determination. Automatically switching the active data link can help to ensure data service continuity, improve user experience and also improve utilization of a user's data plan.

The following description provides examples of smart data service link switching (SLS) among subscriber identity modules (SIMs) in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3 GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the UEs 120 may be configured for smart data service link switching (SLS) among subscriber identity modules (SIMs). As shown in FIG. 1, the UE 120a includes a smart data service link switching (SLS) among subscriber identity modules (SIMs) manager 122. The SLS manager 122 may be configured to communicate data via an active link, wherein the active link comprises a first link of a first data subscriber identity module (SIM) of the UE; determine, based on one or more parameters, to switch the active link to a second link of a second data SIM of the UE; and switch the active link to the second link, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
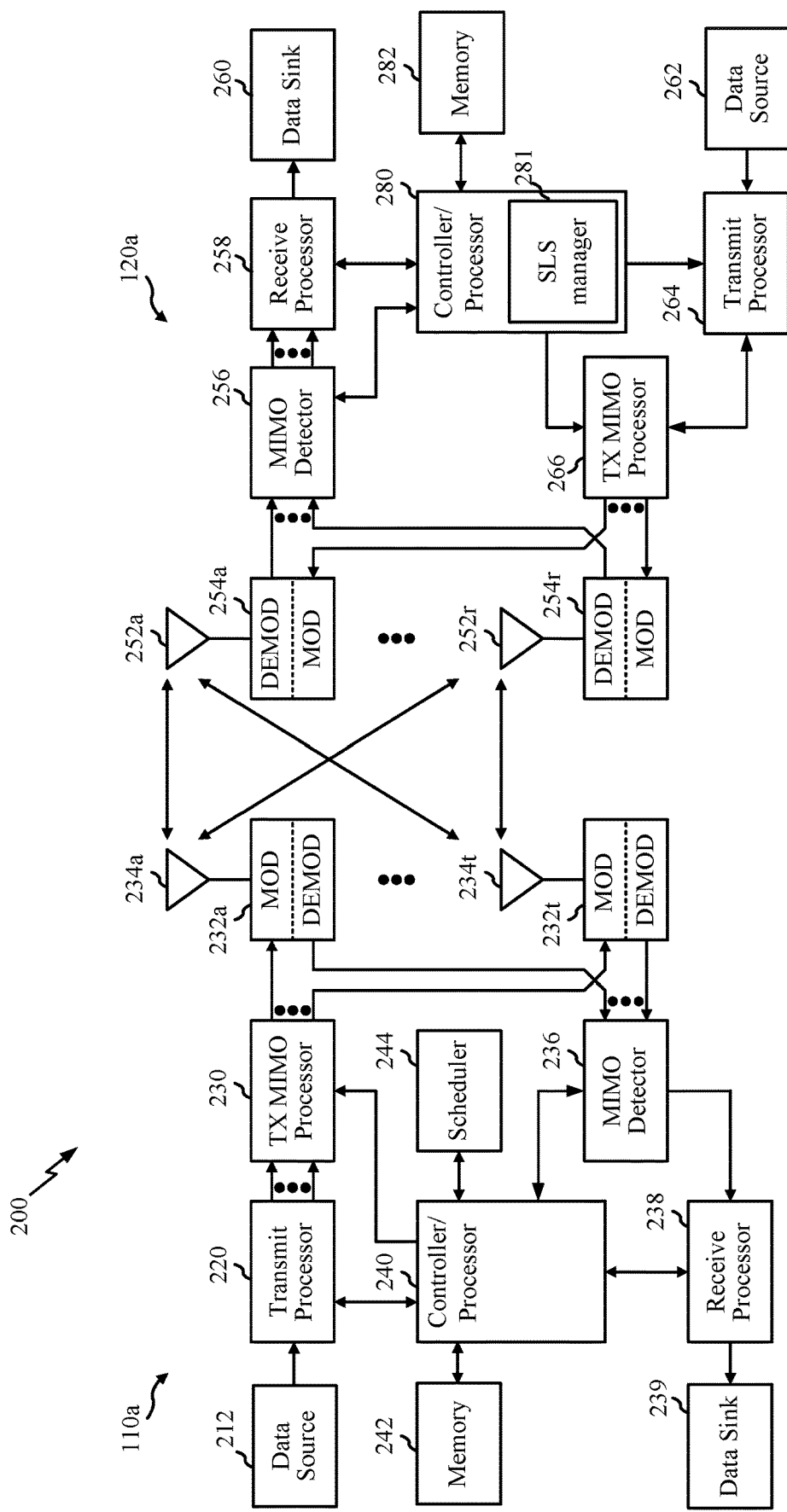
FIG. 2 is a block diagram illustrating an example architecture of a distributed radio access network (RAN), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

The controller/processor 280 and/or other processors and modules at the UE 120a may perform or direct the execution of processes for the techniques described herein. As shown in FIG. 2, the controller/processor 280 of the UE 120a has an SLS manager 281 that may be configured for communicating data via an active link, wherein the active link comprises a first link of a first data subscriber identity module (SIM) of the UE; determining, based on one or more parameters, to switch the active link to a second link of a second data SIM of the UE; and switching the active link to the second link, according to aspects described herein. Although shown at the Controller/Processor, other components of the UE 120a and BS 110a may be used performing the operations described herein.

According to previously known techniques, a user operating UE with multiple subscriber identity modules (SIMs) that may be embedded SIMs (e-SIMs or eSIMs), specifically a MultiSIM MultiStandby (MSMS) UE, can only manually designate one SIM for default data service. If the UE is moved to a location where coverage of the network supporting this SIM (and the corresponding carrier) is not good or there is no service supporting this SIM, then the user has to manually switch the UE to begin using another SIM (and corresponding network) to continue using data service with the other SIM's data plan. Manually switching the UE to begin using another SIM causes a service interruption for the user and an undesirable user experience. Also, the user's multiple SIMs and data plans may not be fully utilized, e.g. due to the user not manually switching back to the first SIM when the user travels back into coverage of the network of the first SIM.

Example Smart Data Service Link Switching Among Subscriber Identity Modules

According to aspects of the present disclosure, a UE automatically determines to switch an active data link to a candidate link selected from among candidate links of multiple SIMs of the UE, based on link quality of the active data link and of the candidate links of the SIMs and/or other criteria, and then switch the active data link according to the determination. Automatically switching the active data link can help to ensure data service continuity, improve user experience and also improve utilization of a user's data plans.

In aspects of the present disclosure, data service and its continuity becomes more and more critical to users. In addition, data plans have become less expensive, due to competition among carriers, and thus the value of the disclosed techniques can be expected to increase.

According to aspects of the present disclosure, determining a SIM to switch the active link to may be extendable by combining artificial intelligence (AI) and/or context awareness of the UE.

In aspects of the present disclosure, a UE may determine to automatically switch and automatically switch an active data link between SIMs that support various cellular technologies, including $2^{nd}$ Generation (2G), $3^{rd}$ Generation (3G), $4^{th}$ Generation (4G or 4G LTE), $5^{th}$ Generation (5G, also referred to as New Radio (NR)), and even future $6^{th}$ Generation (6G) and beyond technologies.

According to aspects of the present disclosure, a UE's determination to automatically switch an active data link is not dependent on the cellular air interface technology of any of the SIMs between which the UE can switch the active data link. Thus, as long as there is diversity of coverage and/or service quality and/or even data plan consumption status among carriers, the disclosed techniques can provide value to a user.

Figure 3:
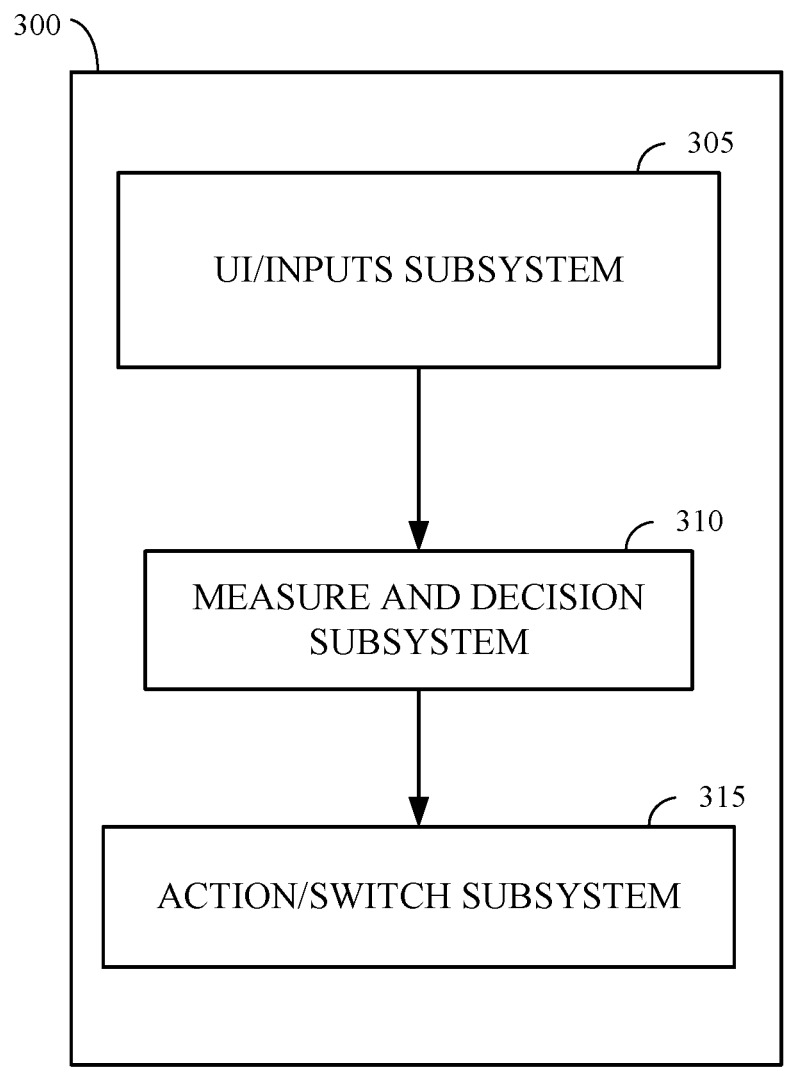
FIG. 3 shows an exemplary subsystem architecture, according to aspects of the present disclosure.

FIG. 3 shows an exemplary subsystem architecture 300, according to aspects of the present disclosure. In the exemplary architecture, a user interface and inputs (UI/Inputs) subsystem 305 provides parameters to a measure and decision subsystem 310. Among the provided parameters are parameters that the UI/Inputs subsystem may abstract from current system settings, such as which SIM is the default to be used for data service, how much data has been used this month in total and/or for this SIM, relevant data plan information for a specific application (for example, data usage of some applications are free of charge for certain types of SIM card), peak and/or average data rate related information for each candidate link. Other provided parameters that may be user selectable include which SIMs can use data services other than the default data service SIM, whether there is a preference for one SIM's data service, and what is the data package quota for determining to change to a data service of another SIM.

Figure 4:
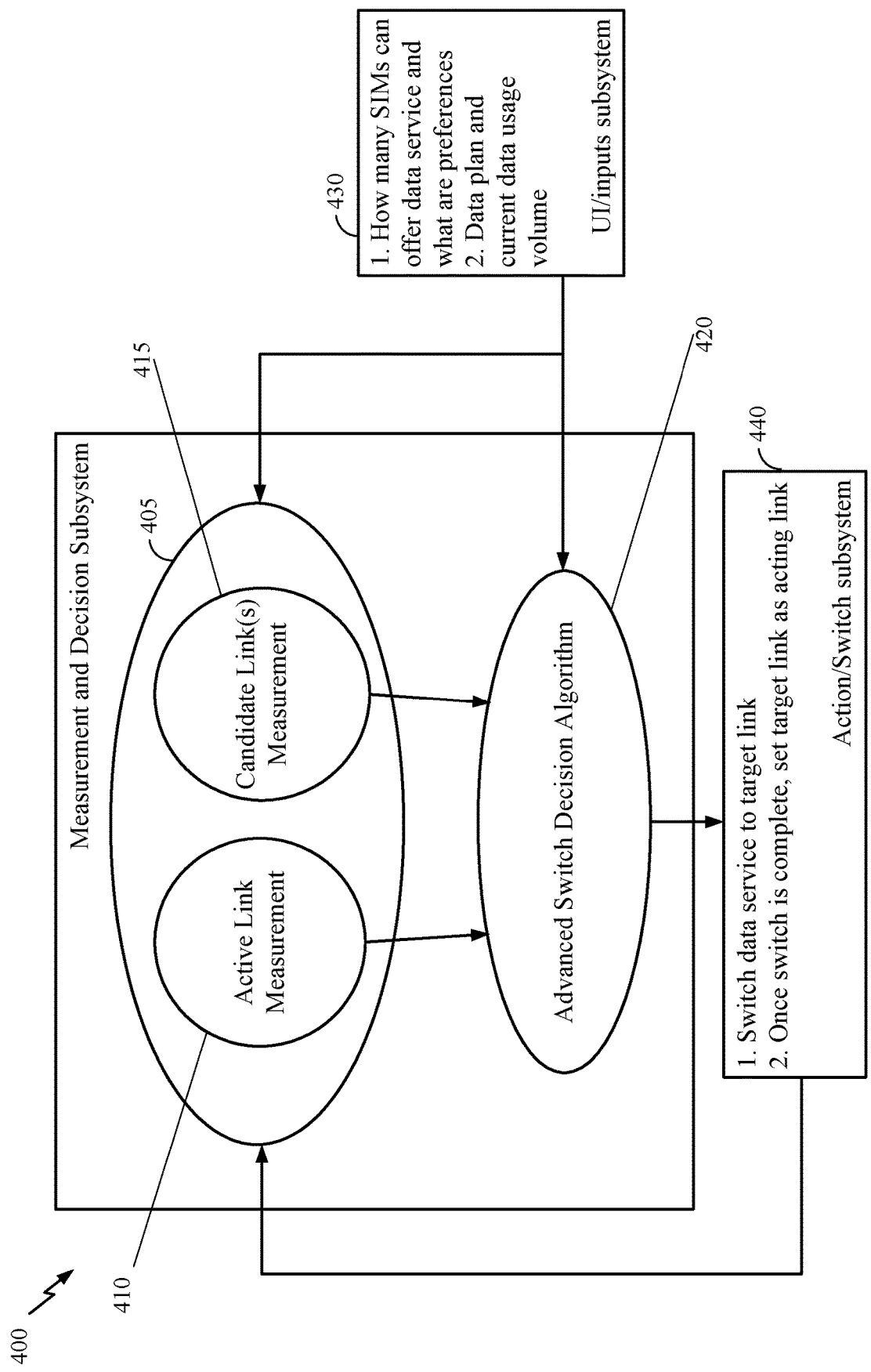
FIG. 4 is a schematic diagram of an exemplary measurement and decision subsystem, according to aspects of the present disclosure.

FIG. 4 is a schematic diagram of an exemplary measurement and decision subsystem 400, according to aspects of the present disclosure. The exemplary measurement and decision subsystem includes a measurement block 405 that includes an active link data service quality measurement part 410 that measures the link quality of the active link and compares the active link quality with a threshold, which is configured in a parameters table and is adjustable (e.g., in response to user input and/or network operator commands). The measurement of the active link quality can be based on a physical layer channel quality indicator (PHY-CQI) provided by a modem of the UE or an application level CQI (APP-CQI) provided by a processor of the UE. The measurement block also includes a candidate link(s) quality measurement part 415. Once the active link CQI is determined by the active link data service quality measurement part to be below the threshold (i.e., as described above), the candidate link quality measurement part will be triggered to start measuring the candidate link(s). The candidate link quality measurement part will estimate a CQI for each candidate link when the modem of the UE is listening for and/or decoding a paging channel or a physical downlink control channel (PDCCH) for the SIM of that candidate link during the SIM's arranged slot cycle. Depending on how many SIMs' links are candidate links (i.e., as determined from parameters provided by a UI/Input subsystem 430 of the UE), all candidate links' estimated CQIs will be collected for an advanced switch decision algorithm block 420 to choose which candidate link will be a target link, i.e., a target link to which to switch the data service of the UE. The measurement and decision subsystem also includes the previously mentioned advanced switch decision algorithm block, which, based on the acting link's CQI and all candidate links' estimated CQIs, user's preference, data plan, and current usage for each SIM and/or link, makes a decision as to which candidate link will be the target link by using an advance switch decision algorithm (ASDA).

According to aspects of the present disclosure, categorizing of links (e.g., determining if the active link CQI is too low to retain service), filtering, averaging, rectifying and sliding window mechanisms may be used in the ASDA to avoid ping-pong effects and other undesirable behaviors.

In aspects of the present disclosure, when the ASDA has determined on a target link (e.g., one of the candidate links) to switch to, an Action/Switch subsystem 440 acts to switch the acting link to the target SIM link, which was provided to the Action/Switch subsystem by the advanced switch decision algorithm block. The switch can be performed by either: 1) simulating a user's action to use the same mechanism to the change the default data service (DDS) to the target SIM to create a data link and service upon it, which may result in data service being interrupted for up to 1 second, depending on the Apps buffer of the UE and whether the switch algorithm is aggressive; or 2) using an IP table mechanism to cause the data link to switch.

Figure 5:
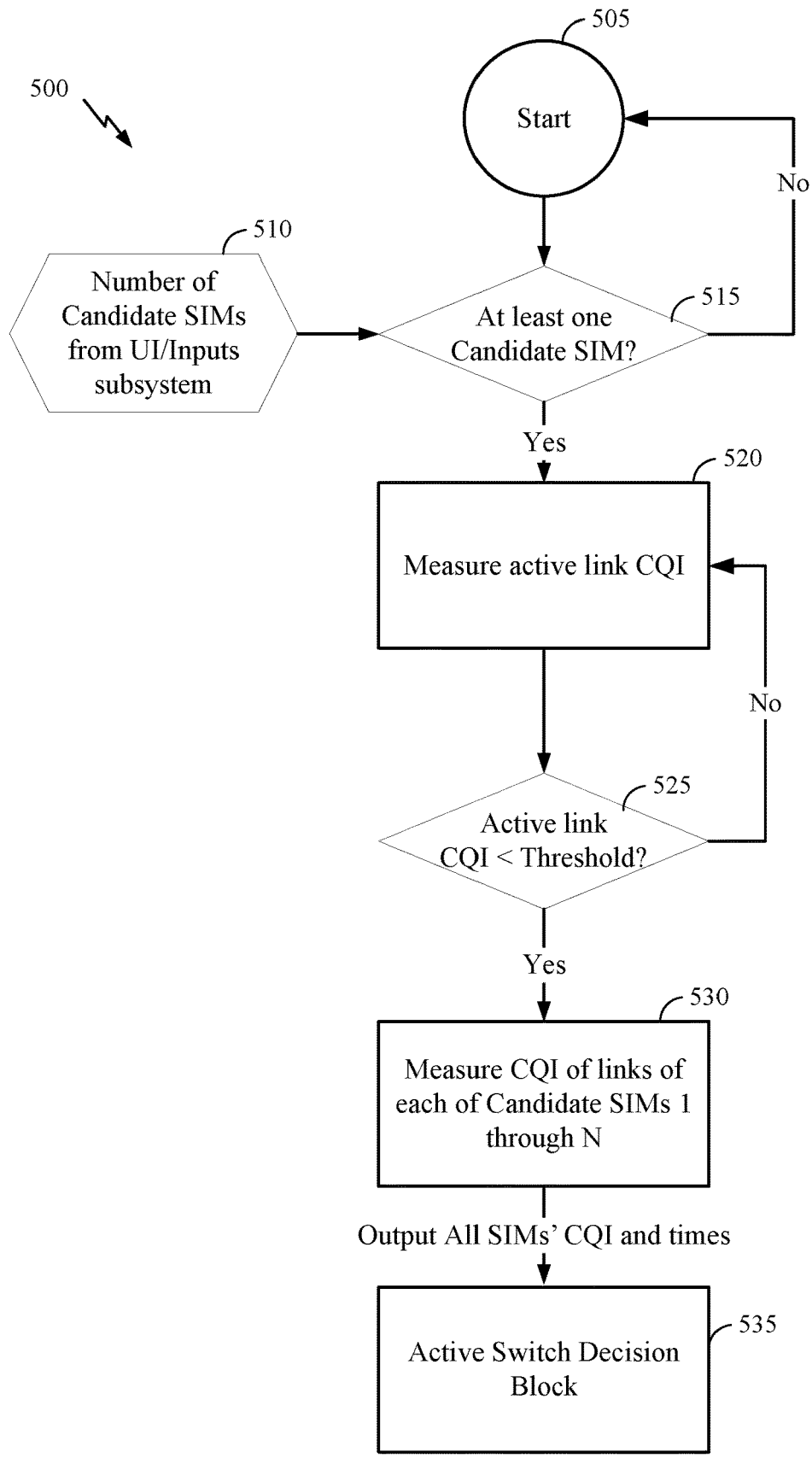
FIG. 5 is a flow chart of an exemplary advanced switch decision algorithm, according to aspects of the present disclosure.

FIG. 5 is a flow chart 500 of an exemplary advanced switch decision algorithm, according to aspects of the present disclosure. Execution of the algorithm begins at 505. At 510, information on the number of candidate SIMs is obtained from the UI/Inputs subsystem. It is determined if there is at least one candidate SIM at 515. If there are no candidate SIMs, then execution returns to the start. If there is at least one candidate SIM, then the CQI of the active link is measured at 520. At 525, it is determined if the CQI of the active link is less than the threshold. If the CQI of the active link is not less than the threshold, then execution continues with measuring the active link CQI at 520. If the CQI of the active link is less than the threshold, the CQIs of links of each of the candidate SIMs 1-N are measured or estimated, as previously described. The measured or estimated CQIs of the candidate links and the active link and the times that those measurements were made are supplied to the active switch decision block 535, which may be running in an Action/Switch subsystem 440, as described above with reference to FIG. 4.

According to aspects of the present disclosure, if the active SIM of a UE is not a preferred SIM or data usage for a data plan of the SIM is about to run out taking into consideration the date of the current month, then the UE (e.g., the advanced switch decision algorithm) may set the threshold higher to ensure the active link can be switched to the preferred SIM in a timely manner (e.g., before a data plan runs out).

In aspects of the present disclosure, the advanced switch decision algorithm can modify the threshold value.

According to aspects of the present disclosure, an advanced switch decision algorithm can make a switching decision based on a pure CQI and/or on other parameters like user preference and data plan usage status.

Figure 6:
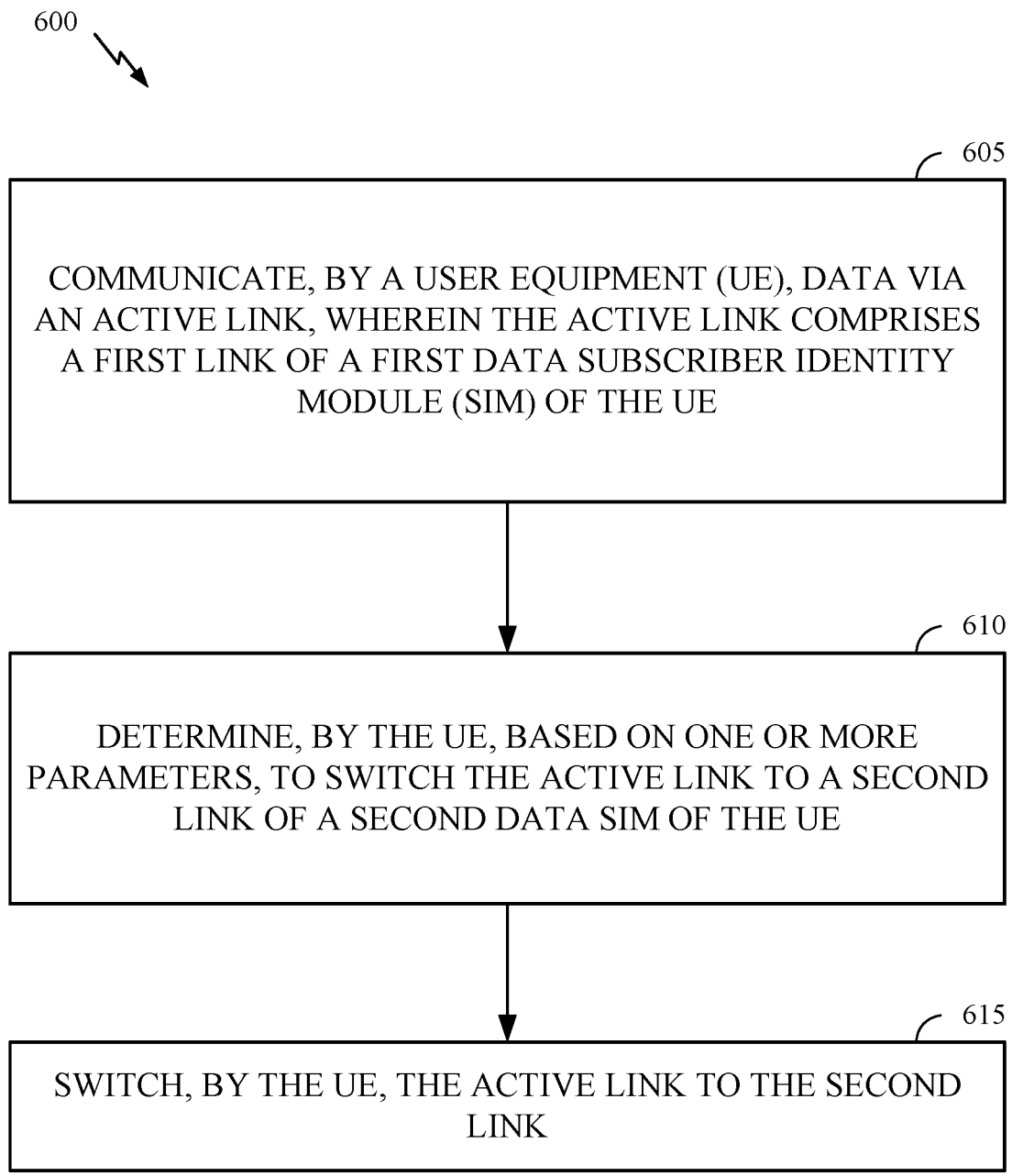
FIG. 6 is a flow diagram illustrating example operations for wireless communication by a UE, in accordance with certain aspects of the present disclosure.

FIG. 6 is a flow diagram illustrating example operations 600 for wireless communication, in accordance with certain aspects of the present disclosure. The operations 600 may be performed, for example, by UE (e.g., such as a UE 120 in the wireless communication network 100). Operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at block 605, by the UE communicating data via an active link, wherein the active link comprises a first link of a first data subscriber identity module (SIM) of the UE. For example, the UE 120a may communicate data to the BS 110a via an active link, the active link including a first link of a first data SIM of the UE.

At block 610, operations 600 continue with the UE determining, based on one or more parameters, to switch the active link to a second link of a second data SIM of the UE. Continuing the example above, the UE 120a may determine, via the controller/processor 280, to switch the active link to a second link of a second data SIM of the UE 120a. The UE 120a may determine to switch based on one or more parameters, such as a measurement of the active link CQI (e.g., at 520 of FIG. 5).

Operations 600 continue at block 615 with the UE switching the active link to the second link. Continuing the example above, the UE 120a may switch the active link to the second link.

According to aspects of the present disclosure, the one or more parameters in block 610 may include at least one of: an indication that the first data SIM or the second data SIM is a default SIM for data service; data plan information for an application; peak data rate information for the first link or the second link; a quantity of data used for the first data SIM or the second data SIM during a current month or a current billing cycle for the UE; and average data rate information for the first link or the second link. For example, the average data rate information may be an indication of a network coverage type. Additionally, the average data rate information may be an indication of a selection between a network using a fourth generation (4G) radio access technology (RAT) or a cell using a fifth generation (5G) RAT. In certain aspects, the selection between a network using a cell using a 4G RAT or a cell using a 5G RAT may be based on a bandwidth of an application session. For example, if an application session has a relatively low bandwidth usage (e.g., texting), the cell using the 4G RAT may be selected. Alternatively, if an application session has a relatively high bandwidth usage (e.g., video streaming), the cell using the 5G RAT may be selected.

In aspects of the present disclosure, the one or more parameters in block 610 may include at least one of: an indication of which of at least one of the first data SIM or the second data SIM can use data services; an indication of a user preference to use at least one of a first data service from the first data SIM or a second data service from the second data SIM; or an indication of at least one of a data package quota for the first data SIM or a data package for the second data SIM. In some cases, the indication of the user preference may include a location of the UE and/or an indication of a time stamp.

According to aspects of the present disclosure, determining to switch the active link as described in block 610 may include: measuring a first link quality of the active link; and determining the first link quality is lower than a threshold, wherein the determining to switch the active link is in response to determining the link quality is lower than the threshold.

In aspects of the present disclosure, a UE performing operations 600 may also determine the threshold based on at least one of a user input, a predefined value, or the one or more parameters of block 610.

According to aspects of the present disclosure, measuring the first link quality may include measuring a physical layer channel quality information (PHY-CQI) of the active link.

In aspects of the present disclosure, measuring the first link quality may include measuring an application level channel quality information (APP-CQI) of the active link.

According to aspects of the present disclosure, a UE performing operations 600 may also: determine the threshold based on an indication that the first SIM is not a preferred SIM.

In aspects of the present disclosure, a UE performing operations 600 may also: determine the threshold based on an indication that a data plan of the first SIM is approaching a maximum quantity of data transferred during a current month or a billing cycle for the UE.

According to aspects of the present disclosure, determining to switch the active link as described in block 610 may include: measuring or estimating a second link quality of the second link; and determining, based on the second link quality, that the second link is better than the first link or a threshold decided based on at least one of the one or more parameters of block 610, wherein the determining to switch the active link is in response to determining the second link is better than the first link.

Figure 7:
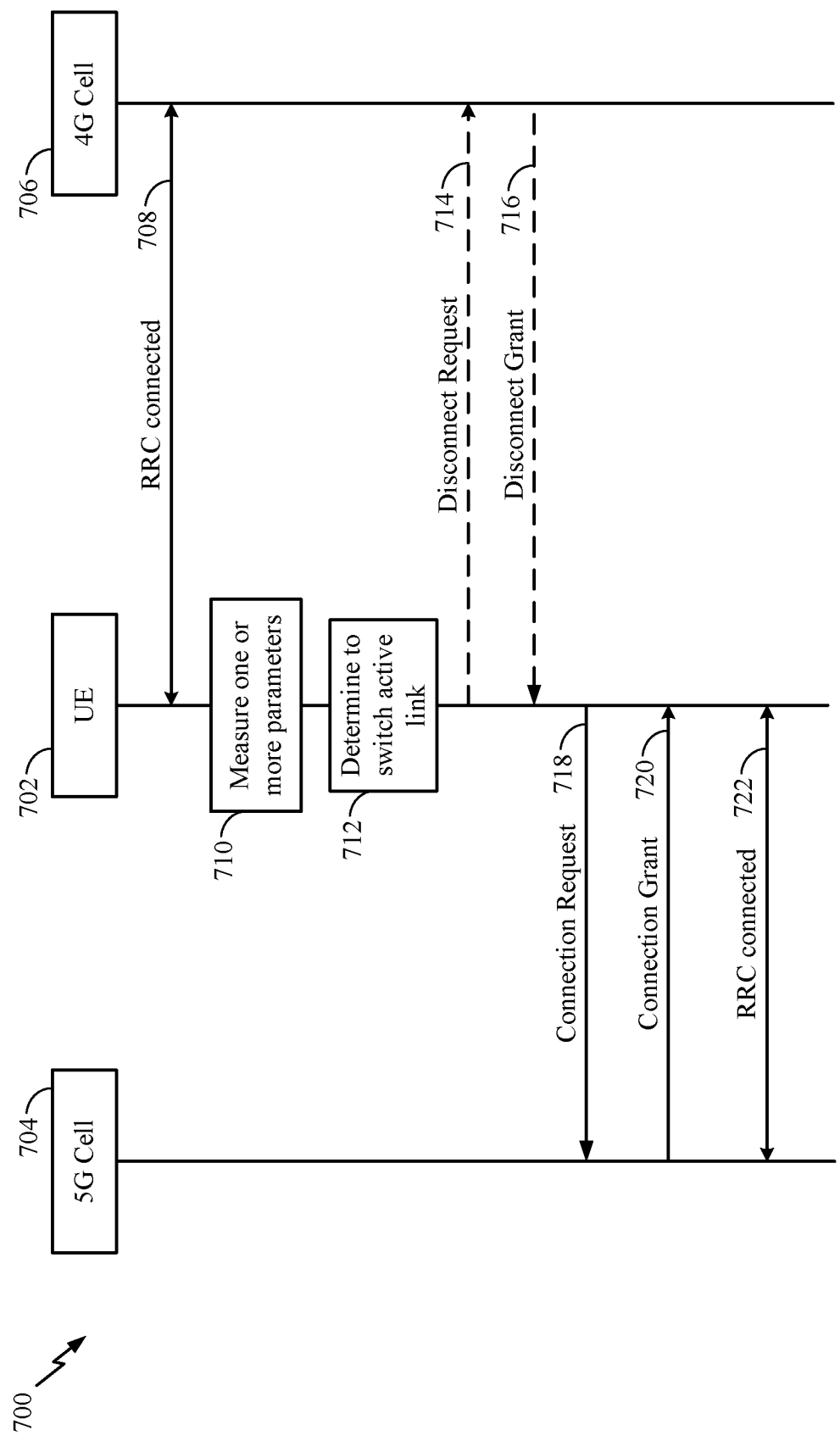
FIG. 7 is an example call flow diagram illustrating communication between a UE, a first cell, and a second cell in accordance with certain aspects of the present disclosure.

FIG. 7 is an example call flow diagram 700 illustrating communications between a UE 702, a second cell 704, and a first cell 706, in accordance with certain aspects of the present disclosure. As described above, a UE may determine to switch from an active link to a second link based on one or more parameters. As illustrated, a UE 702 may be radio resource control (RRC) connected, at 708, with a first cell 706. In certain aspects, the first cell 706 may be a 4G cell. The UE 702, at 710, may measure one or more parameters (e.g., one or more of the parameters described above). For example, the one or more parameters may include at least one of: an indication that the first data SIM or the second data SIM is a default SIM for data service; data plan information for an application; peak data rate information for the first link or the second link; a quantity of data used for the first data SIM or the second data SIM during a current month or a current billing cycle for the UE; and average data rate information for the first link or the second link; or other parameters described herein.

The UE 702, at 712, may determine to switch the active link. In other words, for example, the UE 702 may determine that another link may be better suited for a current application session and determine to switch to that other link. Optionally, if link quality of the link to the first cell 706 is good enough (e.g., RSSI is above a threshold) the UE 702 may send a disconnect request at 714 to the first cell 706 and receive, at 716, a disconnect grant from the first cell 706. If link quality of the link to the first cell 706 is not good enough (e.g., RSSI is below the threshold), then the UE may not send the disconnect request at 714. The UE 702 may send, at 718, a connection request to the second cell 704. In certain aspects, the second cell 704 may be a 5G cell. As shown, the UE 702 may receive a connection grant from the second cell at 720, and the UE 702 may be RRC connected with the second cell 704 at 722.

While aspects of the present disclosure are described in examples where the second cell 704 is a 5G cell and the first cell 706 is a 4G cell, the present disclosure is not so limited. In other aspects, the second cell 704 may use a RAT other than 5G, and the first cell 706 may use a RAT other than 4G.

Figure 8:
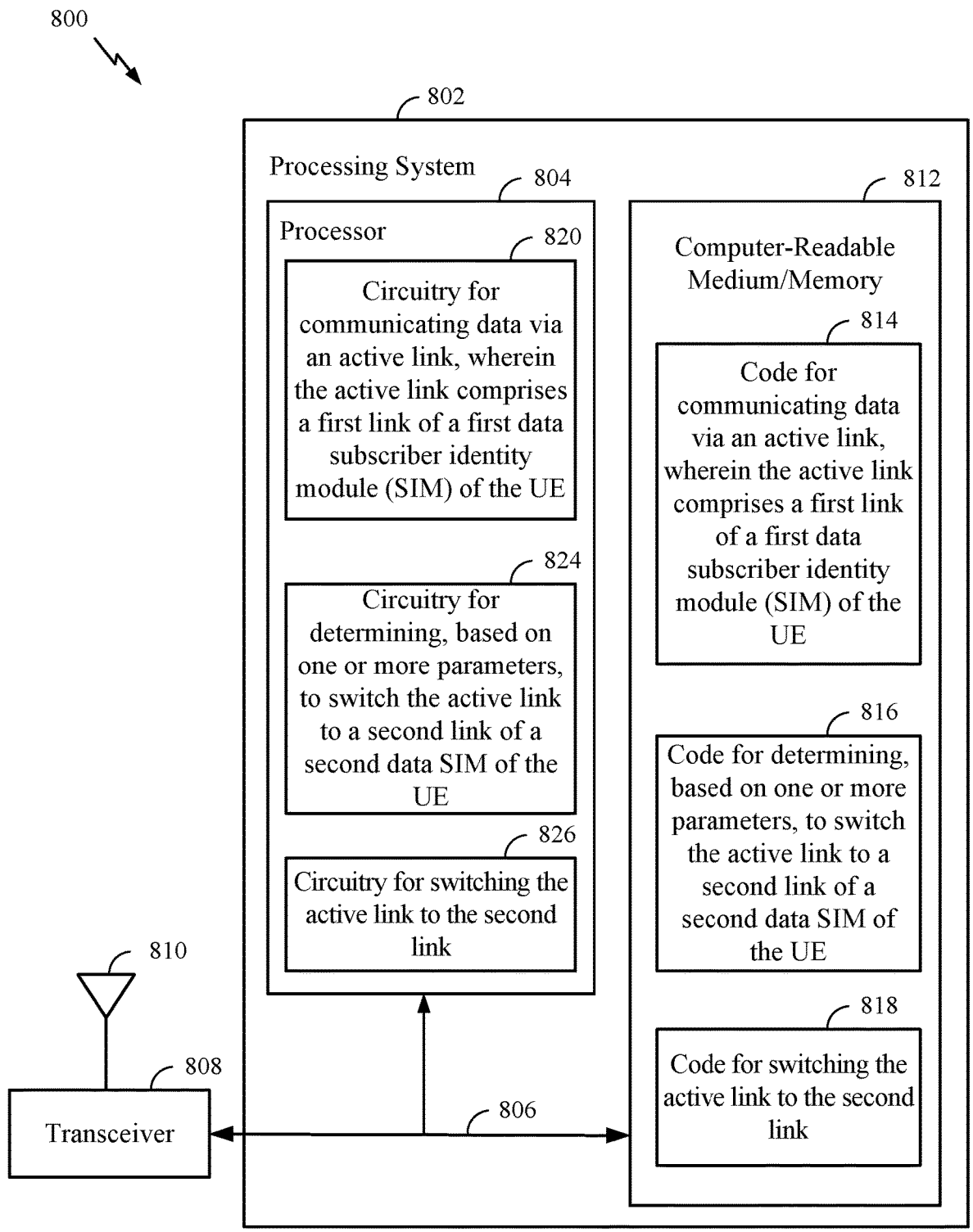
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 6. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 6, or other operations for performing the various techniques discussed herein for SLS. In certain aspects, computer-readable medium/memory 812 stores code 814 for communicating data via an active link, wherein the active link comprises a first link of a first data subscriber identity module (SIM) of the UE, code 816 for determining, based on one or more parameters, to switch the active link to a second link of a second data SIM of the UE, and code 818 for switching the active link to the second link. In certain aspects, the processor 804 has circuitry configured to implement the code stored in the computer-readable medium/memory 812. The processor 804 includes circuitry 820 for communicating data via an active link, wherein the active link comprises a first link of a first data subscriber identity module (SIM) of the UE, circuitry 824 for determining, based on one or more parameters, to switch the active link to a second link of a second data SIM of the UE, and circuitry 826 for switching the active link to the second link.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one"

unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications performed by a user equipment (UE), comprising:
   communicating data via an active link, wherein the active link comprises a first link of a first data subscriber identity module (SIM) of the UE;
   determining, based on one or more parameters, to switch the active link to a second link of a second data SIM of the UE, the one or more parameters comprising average data rate information for the first link or the second link, wherein the average data rate information comprises an indication of a network coverage type; and
   switching the active link to the second link.

2. The method of claim 1, wherein the average data rate information comprises an indication of a selection between a network using a fourth generation (4G) radio access technology (RAT) or a network using a fifth generation (5G) RAT.

3. The method of claim 1, wherein the one or more parameters comprise at least one of: an indication of which of at least one of the first data SIM or the second data SIM can use data services; an indication of a user preference to use at least one of a first data service from the first data SIM or a second data service from the second data SIM; or an indication of at least one of a data package quota for the first data SIM or a data package quota for the second data SIM.

4. The method of claim 3, wherein the indication of the user preference comprises an indication of a location of the UE, an indication of a time stamp, or both.

5. The method of claim 1, wherein determining to switch the active link comprises: measuring a first link quality of the active link; and determining the first link quality is lower than a threshold, wherein the determining to switch the active link is in response to determining the first link quality is lower than the threshold.

6. The method of claim 5, further comprising: determining the threshold based on at least one of a user input, a predefined value, or the one or more parameters.

7. The method of claim 5, wherein measuring the first link quality comprises measuring a physical layer channel quality information (PHY-CQI) of the active link.

8. The method of claim 5, wherein measuring the first link quality comprises measuring an application level channel quality information (APP-CQI) of the active link.

9. The method of claim 5, further comprising: determining the threshold based on an indication that the first SIM is not a preferred SIM.

10. The method of claim 5, further comprising: determining the threshold based on an indication that a data plan of the first SIM is approaching a maximum quantity of data transferred during a current month or a billing cycle for the UE.

11. The method of claim 1, wherein determining to switch the active link comprises: measuring a second link quality of the second link; and determining, based on the second link quality, that the second link is better than the first link or a threshold decided based on at least one of the one or more parameters, wherein the determining to switch the active link is in response to determining the second link is better than the first link.

12. The method of claim 1, wherein the one or more parameters comprises an indication of a quality of service (QoS) requirement.

13. A user equipment (UE) for wireless communications, comprising:
    a processor configured to:
    communicate data via an active link, wherein the active link comprises a first link of a first data subscriber identity module (SIM) of the UE;
    determine, based on one or more parameters, to switch the active link to a second link of a second data SIM of the UE, the one or more parameters comprising average data rate information for the first link or the second link, wherein the average data rate information comprises an indication of a network coverage type; and
    switch the active link to the second link; and
    a memory coupled with the processor.

14. The user equipment UE of claim 13, wherein the average data rate information comprises an indication of a selection between a network using a fourth generation (4G) radio access technology (RAT) or a network using a fifth generation (5G) RAT.

15. The user equipment UE of claim 13, wherein the one or more parameters comprise at least one of: an indication of which of at least one of the first data SIM or the second data SIM can use data services; an indication of a user preference to use at least one of a first data service from the first data SIM or a second data service from the second data SIM; or an indication of at least one of a data package quota for the first data SIM or a data package quota for the second data SIM.

16. The user equipment UE of claim 15, wherein the indication of the user preference comprises an indication of a location of the UE, an indication of a time stamp, or both.

17. The user equipment UE of claim 13, wherein the processor is further configured to: measure a first link quality of the active link; and determine the first link quality is lower than a threshold, wherein the determining to switch the active link is in response to determining the first link quality is lower than the threshold.

18. The user equipment UE of claim 17, wherein the processor is further configured to determine the threshold based on at least one of a user input, a predefined value, or the one or more parameters.

19. The user equipment UE of claim 17, wherein the processor is further configured to measure the first link quality by measuring a physical layer channel quality information (PHY-CQI) of the active link.

20. The user equipment UE of claim 17, wherein the processor is further configured to measure the first link quality by measuring an application level channel quality information (APP-CQI) of the active link.

21. The user equipment UE of claim 17, wherein the processor is further configured to determine the threshold based on an indication that the first SIM is not a preferred SIM.

22. The user equipment UE of claim 17, wherein the processor is further configured to determine the threshold based on an indication that a data plan of the first SIM is approaching a maximum quantity of data transferred during a current month or a billing cycle for the UE.

23. The user equipment UE of claim 13, wherein the processor is further configured to determine to switch the active link by: measuring a second link quality of the second link; and determining, based on the second link quality, that the second link is better than the first link or a threshold decided based on at least one of the one or more parameters, wherein the determining to switch the active link is in response to determining the second link is better than the first link.

24. The user equipment UE of claim 13, wherein the one or more parameters comprises an indication of a quality of service (QoS) requirement.

25. An user equipment UE for wireless communications, comprising:
  means for communicating data via an active link, wherein the active link comprises a first link of a first data subscriber identity module (SIM) of the apparatus;
  means for determining, based on one or more parameters, to switch the active link to a second link of a second data SIM of the apparatus, the one or more parameters comprising average data rate information for the first link or the second link, wherein the average data rate information comprises an indication of a network coverage type; and means for switching the active link to the second link.

26. A non-transitory computer-readable medium having code stored thereon that, when executed by a processing system, cause the processing system to:
  communicate data via an active link, wherein the active link comprises a first link of a first data subscriber identity module (SIM) of the processing system;
  determine, based on one or more parameters, to switch the active link to a second link of a second data SIM of the processing system, the one or more parameters comprising average data rate information for the first link or the second link, wherein the average data rate information comprises an indication of a network coverage type; and
  switch the active link to the second link.

* * * * *